United States Patent [19]

Bartolomei

[11] 3,981,568

[45] Sept. 21, 1976

[54] STRIPED DICHROIC FILTER WITH BUTTED STRIPES AND DUAL LIFT-OFF METHOD FOR MAKING THE SAME

[75] Inventor: Leroy A. Bartolomei, Santa Rosa, Calif.

[73] Assignee: Optical Coating Laboratory, Inc., Santa Rosa, Calif.

[22] Filed: July 1, 1974

[21] Appl. No.: 484,401

Related U.S. Application Data

[62] Division of Ser. No. 305,692, Nov. 13, 1972, abandoned.

[52] U.S. Cl. ............................... 350/317; 350/166; 427/168; 427/259; 427/264; 427/266; 427/309
[51] Int. Cl.² ...................... B05D 5/06; G02B 5/28; G02B 5/22
[58] Field of Search ............... 117/8.5, 18, 33.3, 35, 117/37 R, 38; 178/5.45 T; 350/162 SF, 166, 317; 427/162, 168, 264, 266, 259, 309

[56] References Cited
UNITED STATES PATENTS 3,617,331  11/1971  Illsley et al. .................... 117/33.3

FOREIGN PATENTS OR APPLICATIONS 707,149   4/1954  United Kingdom
790,681   2/1958  United Kingdom ................. 350/317
874,462   8/1961  United Kingdom
896,934   5/1962  United Kingdom

*Primary Examiner*—Michael R. Lusignan
*Attorney, Agent, or Firm*—Flehr, Hohbach, Test, Albritton & Herbert

[57] ABSTRACT

A striped dichroic filter having a substrate with a surface. A first set of spaced parallel stripes capable of reflecting at least one color are carried by the surface. A second set of spaced parallel stripes capable of reflecting at least one different color different from said one color reflected by the first set of stripes is also carried by the surface. The first and second sets of stripes are disposed so that they are substantially parallel to each other and so that they are in abutting relationship with substantially no space or overlap between adjacent stripes. Third and additional sets of stripes for reflecting other colors may be provided.

In the method for making the striped dichroic filter, a dual lift-off is used which utilizes both metal and resist lift-off techniques that are mutually exclusive.

8 Claims, 14 Drawing Figures

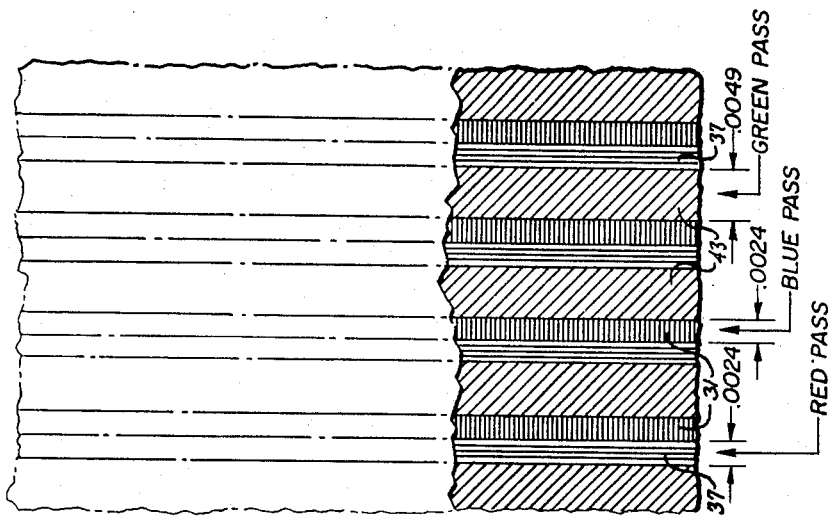
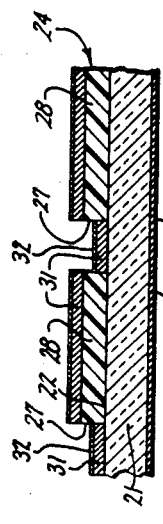
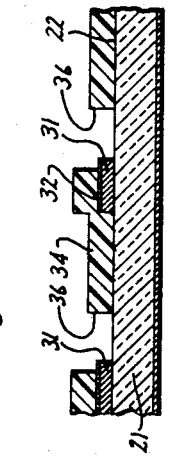
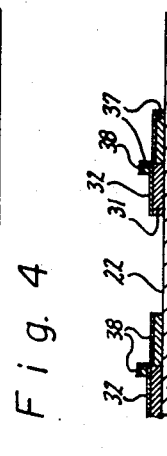
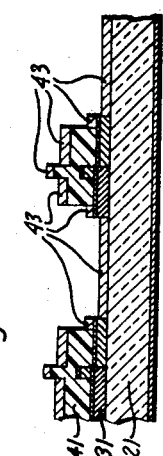
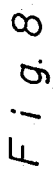
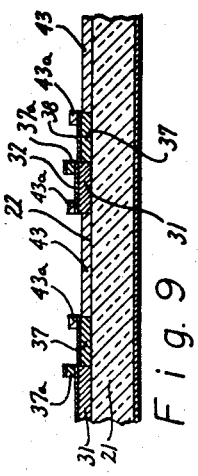
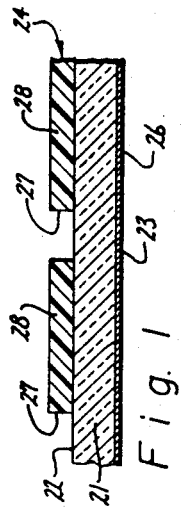
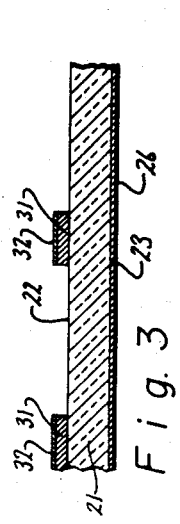
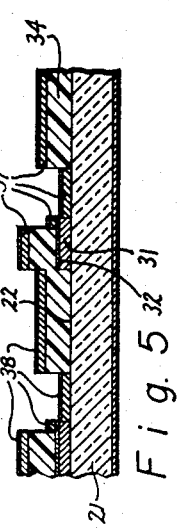
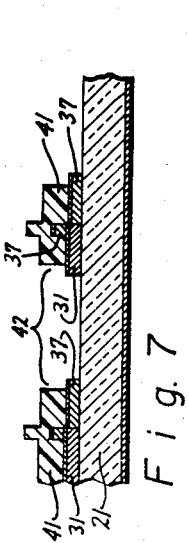

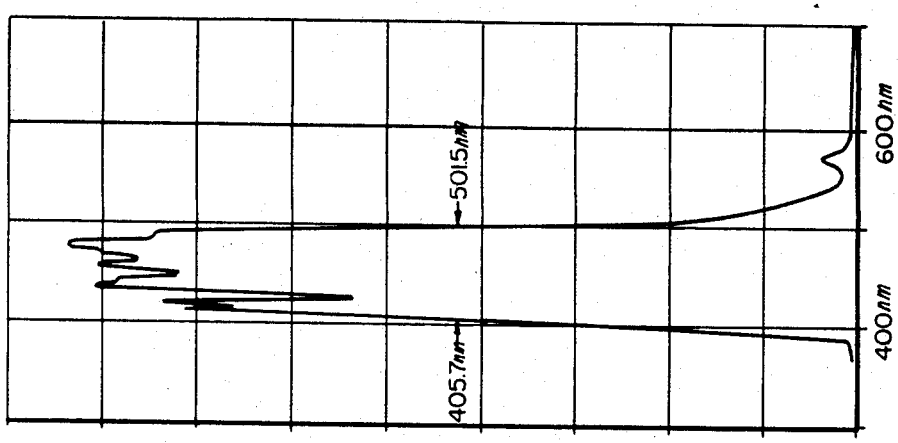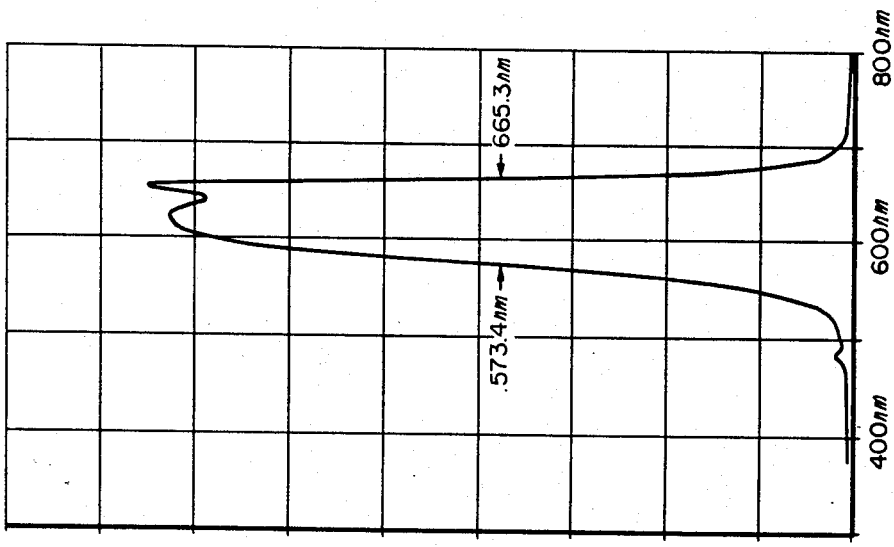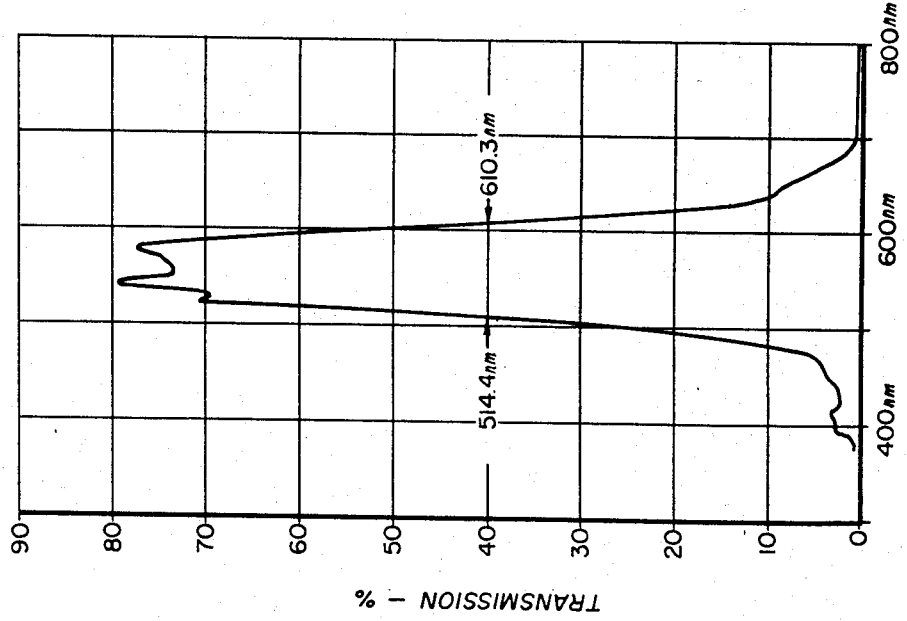

STRIPED DICHROIC FILTER WITH BUTTED STRIPES AND DUAL LIFT-OFF METHOD FOR MAKING THE SAME

This is a division of application Ser. No. 305,692 filed Nov. 13, 1972, now abandoned.

BACKGROUND OF THE INVENTION

In copending application Ser. No. 135,131, filed Apr. 19, 1971, now U.S. Pat. No. 3,771,857, there is disclosed a cross-stripe filter in which the stripes cross over each other. In certain applications, there is a need for a filter which has parallel stripes which cannot be fulfilled with the cross-striped filter. With prior art processes it has been dificult, if not impossible, to obtain perfectly butted stripes. There is, therefore, a need for such a filter and a method for making the same.

SUMMARY OF THE INVENTION AND OBJECTS

The striped dichroic filter consists of a substantially transparent substrate which has a generally planar surface. A first-set of parallel stripes capable of reflecting at least one color are disposed on the surface. A second set of spaced parallel stripes capable of reflecting at least one color different from said one color reflected by the first set of stripes are also disposed on the surface. The first and second sets of stripes are disposed so that they are substantially parallel to each other and so that they are in abutting relationship with substantially no space or overlap between adjacent stripes from said sets of stripes. Each of the stripes is formed of a plurality of layers of high and low index dielectric materials.

In the method for making a striped dichroic filter, a substantially transparent substrate having a surface is provided. The photoresist is applied to the surface and exposed through a mask and developed to provide a pattern of photoresist which is complementary to that required for the first dichroic coating to be applied. The first dichroic coating is then applied and thereafter a thick layer of metal is deposited over the dichroic coating. The photoresist is removed leaving the dichroic coating with the metal overcoat in the required pattern. A second layer of photoresist is applied which is exposed through a mask and then developed to provide a pattern which is complementary to the second dichroic coating which is to be applied. A biased mask is utilized for exposing the second layer of photoresist that ensures an overlap of the first and second dichroic coatings. The second dichroic coating is then applied and a thick metal overcoat is applied to the second dichroic coating. The photoresist is removed and the same process used for the second dichroic coating is repeated for the third dichroic coating. The third dichroic coating is not overcoated with metal. All metal is etched away removing all the overlap areas so that there results spaced parallel stripes which are abutted with substantially no space therebetween.

In general, it is an object of the present invention to provide a striped dichroic filter which has parallel butted stripes with substantially no space between adjacent stripes.

Another object of the invention is to provide a method for producing the striped dichroic filter of the above character.

Another object of the invention is to provide a method of the above character in which a dual lift-off technique is utilized.

Another object of the invention is to provide a method of the above character in which both metal and resist lift-off techniques are utilized.

Another object of the invention is to provide a method of the above character which is applicable to filters that require one or more layers of different materials in complementary patterns.

Another object of the invention is to provide a filter of the above character in which optimum signal to noise performance is realized.

Additional objects and features of the invention will appear from the following description in which the preferred embodiment of the article and the method are set forth in detail in conjunction with the accompanying drawings.

BRIEF DESCRIPTION OF THE DRAWINGS

FIGS. 1–10 are cross-sectional views showing the process steps utilized in conjunction with the dual lift-off method for producing a striped dichroic filter with butted stripes incorporating the present invention.

FIG. 11 is a top plan view of a portion of a filter incorporating the present invention.

FIG. 12 is a curve showing the type of spectral performance which can be obtained from a filter incorporating the present invention.

DESCRIPTION OF PREFERRED EMBODIMENTS

The process steps for fabricating a striped dichroic filter with butted strips incorporating the present invention utilizing the dual lift-off method for making the same is shown in FIGS. 1–10. As shown in FIG. 1, a substrate 21 is formed of a suitable visually transparent material such as glass. One glass found to be satisfactory is a soda lime glass. Although the invention is described primarily for use with a transparent substrate, it should be appreciated that the substrate could be opaque such as a semiconductor wafer used for fabricating integrated circuits. The substrate 21 is provided with first and second spaced parallel surfaces 22 and 23. The substrate 21 can have any desired size; for example, it can be approximately 2 by 2 inches and have a thickness of approximately 0.04 inch.

The substrate 21 is thoroughly cleaned and thereafter a layer 24 of a suitable masking material such as photoresist is deposited on the first surface 22. The resist was deposited in a conventional manner such as by dropping drops of the same onto a spinning substrate. The substrate with the photoresist thereon was vacuum baked for a suitable period of time as, for example, approximately 15 minutes at 70°C and thereafter allowed to cure.

An anti-halation coating 26 was applied to the second surface 23. This can be applied by brushing or spraying the coating onto the surface 23 and thereafter permitting the same to air dry. One material found to be particularly satisfactory for this purpose is supplied by Norland. The anti-halation coating is provided to prevent second surface reflection from the surface 23 of the substrate. If the anti-halation coating is not present, some of the ultra-violet energy may be reflected back by the second surface 23 to expose additional portions of the photoresist which would be undesirable. In other words, a ghost image would be produced in the photoresist. The anti-halation coating on the surface 23 serves to make the surface 23 look as if there were no discontinuity and, in addition, the anti-halation coating serves to absorb ultra-violet energy so that in effect the glass substrate 21 appears to have infinite depth and, therefore, does not provide a second surface reflection.

The photoresist layer 24 is exposed through a first master mask, such a a chrome photo mask, utilizing collimated light from a light source which includes a xenon arc lamp. This ensures that a collimated been will strike the mask and will penetrate the photoresist layer 24 in straight lines. The ultra-violet light emanating from the xenon arc source polymerizes the photoresist where it strikes the photoresist. The first master which is utilized is a master which is identical to the configuration of the lines which are to be utilized in the filter. In other words, the clear areas on the chrome mask are identical in configuration to the coated lines or pattern that are desired on the substrate or part 21. After the layer of photoresist 24 has been exposed through the first master, the photoresist is spray developed and rinsed so that the undesired photoresist is removed to provide openings or recesses 27 between stripes 28 of the photoresist layer 24 to expose areas of the surface 22 corresponding exactly to the stripe or line dimensions desired for the first dichroic coating.

The part shown in FIG. 1 is then vacuum baked for a suitable period of time. The resist pattern which remains is complementary to the pattern which is desired in the first dichroic coating which is to be placed on the substrate surface 22. Thus, the portions of the resist layer 24 which remain are in the form of spaced parallel stripes 28 extending across the substrate 21. It is desirable that the stripes 28 be from two to three times thicker than the multi-layer dichroic coating which is to be deposited in the recesses 27. To avoid excessive shadowing during application of the multi-layer coating, a width to height ratio of at least 5 is desirable for the lines or stripes 28.

A multi-layer dichroic coating 31 of a suitable type such as a blue pass or blue transmitting filter 31 is deposited in the channel or grooves 27 in contact with and adherent to the surface 22 and also in contact and adherent to the remaining resist stripes 28. As can be seen from FIG. 2, this multilayer coating 31 has a thickness which is substantially less than the thickness of the photoresist stripes 28. The coating 31 is of a conventional type such as one formed of multiple layers of high and low index materials such as quarter-wave gas-reacted titanium oxide and fused silica or zirconium oxide and fused silica. It is desirable that the photoresist stripes 28 in general have a thickness which is substantially greater than the thickness of the coating which is to be applied because the thickness of the photoresist may vary over the first surface 22. It is necessary that the photoresist stripes 28 have a height which is substantially above the coating 31 so that the side walls of the photoresist stripes will be exposed.

After the multi-layer coating 31 has been deposited, a material different from photoresist such as a relatively thick layer 32 of metal of a suitable type like chrome is deposited on the surface of the coating 31. The metal should be chosen so that it has a coefficient of expansion which is close to that of glass. The metal overcoat layer 32 is to prevent the overlap from the second coating which is applied to the substrate from adhering directly to the first dichroic coating 31 as hereinafter described.

After the coating operations shown in FIG. 2 have been completed, the structure or part which is shown in FIG. 2 is immersed in xylene which serves as a solvent that attacks the photoresist layer along the exposed side walls and thereafter loosens, swells and dissolves the photoresist. The xylene softens the photoresist so that it can be removed by scrubbing so that all that remains are the blue pass stripes 31 which have been overcoated with the metal layer 32.

The part shown in FIG. 3 is cleaned and dried and thereafter a second layer 34 of photoresist of the same type hereinbefore described is deposited on the part to a suitable thickness to cover the layers 31 and 32 and the spaces therebetween. The second layer 34 of photoresist is exposed to ultra-violet light through a second master mask having a second pattern therein. This second pattern is aligned with the first pattern formed by the stripes 31 in a suitable manner such as by use of a mask aligner. The second master mask is a biased mask. In other words, it is a mask in which the area which is to be unmasked of the photoresist is wider than the line desired so that there is some overlap of the adjacent line. The photoresist layer 34 is exposed and developed and the undesired portion of the photoresist is removed to provide elongate recesses 36 which are parallel to the stripes 31. As can be seen from FIG. 4, the recesses 36 in the photoresist layer 34 extend over the edge of the blue pass layer 31. A red pass filter 37 is deposited in the recesses 36 and over the photoresist layer 34 as shown in FIG. 5. The red pass filter is a conventional type and consists of multiple layers formed of TiO and fused silica or $ZrO_2$ and fused silica. A metal layer 38 similar to the metal layer 32 is deposited over the red pass filter 37 as shown in FIG. 5. After the metal layer 38 has been deposited, the part can be soaked in a suitable solvent such as xylene as hereinbefore explained so that xylene will attack the exposed side walls of the photoresist layer 34 so that the photoresist layer can be removed by scrubbing to provide the structure or part which is shown in FIG. 6. The red pass overlaps remain on top of the blue pass stripes.

Another layer 41 of photoresist is then deposited over the part or structure which is shown in FIG. 6 in the same manner as the previous layers of photoresist. The photoresist is then exposed through a third master mask which is provided with biased stripes which also expose wider stripes on the photoresist so that there are overlaps over the red pass and blue pass stripes. The third master mask is aligned with the red and blue pass stripes. However, the alignment is not as critical as with the second master mask because the green pass stripes will overlap both the red pass and blue pass stripes. The photoresist layer 41 is then exposed through the third master mask. The photoresist is then developed and the undesired photoresist is removed as shown in FIG. 7 to provide elongate recesses 42 extending between the red pass and blue pass stripes and having portions overlapping the red pass and blue pass stripes. A green pass layer 43 is then formed in the recesses 42 and over the exposed portions of the red pass and blue pass filter stripes and the remaining photoresist as shown in FIG. 8. The green pass filter 43 is of a conventional type and, for example, can consist of a plurality of layers formed of gas-reacted titanium oxide and fused silica. No metal overlay is provided on the green pass filter 43.

The part or substrate shown in FIG. 8 is then soaked in a suitable solvent such as xylene in the manner hereinbefore described to attack the exposed side walls of the photoresist for a suitable period of time. Then the parts are scrubbed as hereinbefore described to remove the photoresist. There remain the blue pass stripes 31, the red pass stripes 37, the green pass stripes 43, the overlap portions 37a of the red pass stripes and the overlap portions 43a of the green pass stripes as shown in FIG. 9. The part or structure is then immersed in the solution which will attack the metal layers 32 and 38 as, for example, ferric chloride. The ferric chloride etches away the metal so that the pedestal-like portions 37a and 43a can be readily removed. By way of example, this can be accomplished by applying a tape to the surface of the substrate overlying the pedestal-like portions 37a and 43a and then slowly pulling the tape upwardly to lift off the pedestal-like portions 37a and 43a so that there only remains the blue pass stripes 31, red pass stripes 37 and the green pass stripes 43 as shown in FIG. 10.

It has been found that the dual lift-off process described above in making the completed structure or article which is shown in FIG. 10 does work very satisfactorily and does produce an article which has uniform parallel stripes of blue pass, red pass and green pass which are perfectly butted together with no space therebetween. This is accomplished through the process hereinbefore described in which metal barrier layers are utilized between the first and second and between the second and third coatings. By etching away the metal layers, the overlap portions of the filters can be readily removed while still leaving perfectly butted blue pass, red pass and green pass parallel stripes. By etching the metal away, it is possible to remove any overlap of one filtered layer with respect to another.

From the present invention, it can be seen that optimum power efficiency is obtained since there are no overlap areas which make for unusable or non-usable color information or other clear areas which would desaturate the color signal.

A plan view of a portion of the parallel striped filter produced by the present process is shown in FIG. 11. As shown therein, the blue pass filter 31, the red pass filter 37 and the green pass filter 43 are represented as parallel sequential stripes which abut each other with no space therebetween. The stripes shown in FIG. 11 have been color coded to represent the particular filters. Thus, the filter 31 transmits the blue energy and reflects red and green energy. The filter 37 transmits the red energy and reflects green and blue energy. The filter 43 transmits green energy and reflects the red and blue. The parallel striped filter is ready for use in numerous applications such as described in copending application Ser. No. 135,131, filed Apr. 19, 1971, now U.S. Pat. No. 3,771,857. The present filter will provide all the information required for a color picture while utilizing a single lens to perform the viewing. The parallel striped filter requires simpler electronics in a system utilizing such a filter than does a cross stripe filter of the type describe in copending application Ser. No. 135,131, filed Apr. 19, 1971, now U.S. Pat. No. 3,771,857.

In the embodiment of the invention described in FIGS. 1–11, the primary colors of blue, red and green were utilized rather than complementary colors. When utilizing the primary colors, two stacks are required for each color because to obtain the color it is necessry to reflect two colors. For example, as pointed out above, for a blue pass or transmitting filter, it is necessary to provide a separate reflecting stack for reflecting the red and a separate reflecting stack for reflecting the green. Similarly, for the red pass filter 37, it is necessary to provide a reflecting stack for the green and a reflecting stack for the blue. For the green pass filter 43, it is necessary to provide a reflecting stack for the red and a reflecting stack for the blue. Thus, when the primary colors are utilized, the red pass, blue pass and green pass filters provide cyan, yellow and magenta reflection, respectively. When complementary colors, that is, cyan, yellow and magenta are used for transmission, it is only necessary to reflect one color for each of the complementary colors. Therefore, such filters require only one stack per color thereby making possible a thinner and less expensive coating.

By way of example, a parallel striped filter incorporating the present invention utilized a substrate 21 having a size of 2 by 2 inches formed of a soda lime glass and having polished first and second surfaces.

The spectral performance of a filter constructed in this manner is shown in FIG. 12. The filter was used in conjunction with a hot mirror of the type described in copending patent application Ser. No. 71,009, filed Sept. 10, 1970, now U.S. Pat. No. 3,682,528, to trim the blue and red ends of the spectrum. the curve in FIG. 12A is for the green transmitting filter in series with the hot mirror, the curve in FIG. 12B is for the red transmitting filter in series with the hot mirror and the curve in FIG. 12C is for the blue transmitting filter in series with the hot mirror. The cut-on and cut-off performance of the respective color filter is set forth in FIG. 12. Without the hot mirror, the blue filter had a cut-on of 487.5 nm, the green filter had a cut-on of 513.9 nm and a cut-off of 608.9 nm, and the red filter had a cut-on of 575.7 nm. There was substantially perfect butting between the stripes forming the filters and, in addition, there were no gaps or overlaps in the coating. This perfect butting made is possible to achieve optimum signal to noise performance from the filter.

From the foregoing, it can be seen that there has been provided a parallel striped filter which can be readily used with a positive color or complementary color system. A particularly useful application for such a filter is a single tube TV camera. When a positive color system is utilized, only one vidicon tube and rather simple electronics are required for use in connection with the same. The dual lift-off process which is disclosed herein for making the present parallel stripe filter is particularly useful in that it makes possible the fabrication of the parallel striped filter with butting stripes with no space therebetween.

Although the present invention has been described principally in connection with dichroic filters, it is readily apparent that the method herein disclosed is applicable for use in any article which requires forming thereon complementary and/or supplementary patterns where a butt joint is desired between the patterns. With the present invention, it is possible to provide more than three stripes. For example, a fourth stripe could be provided which could be clear or black.

It is apparent from the foregoing that there has been provided a new and improved parallel stripe filter and method for making the same which has many advantages. Parallel stripes can be readily provided with substantially perfect butting and without spaces therebetween. The parts are such that they can be produced with relative ease with the present process and with a high yield.

I claim:

1. A method for forming supplementary pattern in a spatial relationship of first and second coatings on a substrate having a surface comprising, forming a first layer having a pattern of a first plurality of spaced parallel stripes of a first material on said surface of said substrate which is complementary to that required for the first coating, applying a first coating to the surface and overlying the pattern on the first material, forming a first layer of a second material on said first coating, removing the first layer of first material by etching so that there remains on the surface the first coating with an overcoat of the second material, forming a second layer having a pattern of second plurality of spaced parallel stripes of the first material complementary to that required for the second coating, said pattern of the second layer of the first material serving as a bias mask and being biased so that there will be an overlap of the first and second coatings, applying the second coating, applying a second layer of the second material on the second coating, removing the second layer of the first material by etching and removing all of the layers of the second material by etching so that there remains the first and second coatings in patterns in which the edges of the first and second pluralities of stripes of the patterns abut each other with no overlap.

2. A method as in claim 1 wherein the first coating is a dichroic coating reflecting at least one color and the second coating is a dichroic coating reflecting at least another color.

3. A method as in claim 1 wherein said dichroic coatings are each formed of a plurality of layers.

4. A method as in claim 3 wherein said dichroic coatings are formed of high and low index dielectric materials.

5. A method as in claim 1 together with the step of forming a third layer of the first material in a pattern which is complementary to the pattern desired for a third coating, applying the third coating, and thereafter performing the steps of removing the layers formed of the second material.

6. A method as in claim 1 wherein the first material is a photoresist and the second material is a metal.

7. A method as in claim 1 wherein the first and second materials can be selectively removed by mutually exclusive chemical agents in which one chemical agent will attack one material and not the other and the other chemical agent will attack the other material and not the one material.

8. A product produced by the method of claim 1.

* * * * *